United States Patent
Seminara

(10) Patent No.: US 9,321,319 B2
(45) Date of Patent: Apr. 26, 2016

(54) HYDRAULIC HEIGHT ADJUSTING SYSTEM FOR A VEHICLE

(71) Applicant: Sistemi Sospensioni S.p.A., Corbetta Milano (IT)

(72) Inventor: Massimo Seminara, Asti (IT)

(73) Assignee: SISTEMI SOSPENSIONI S.P.A., Corbetta, Milan (IT)

(*) Notice: Subject to any disclaimer, the term of this patent is extended or adjusted under 35 U.S.C. 154(b) by 0 days.

(21) Appl. No.: 14/372,911

(22) PCT Filed: Jan. 17, 2013

(86) PCT No.: PCT/EP2013/050827
§ 371 (c)(1),
(2) Date: Jul. 17, 2014

(87) PCT Pub. No.: WO2013/107812
PCT Pub. Date: Jul. 25, 2013

(65) Prior Publication Data
US 2015/0028552 A1    Jan. 29, 2015

(30) Foreign Application Priority Data
Jan. 18, 2012  (EP) .................................... 12151625

(51) Int. Cl.
*B60G 17/018* (2006.01)
*B60G 17/056* (2006.01)
*B60G 17/015* (2006.01)

(52) U.S. Cl.
CPC .......... *B60G 17/018* (2013.01); *B60G 17/0152* (2013.01); *B60G 17/056* (2013.01); *B60G 17/0565* (2013.01); *B60G 2400/0512* (2013.01); *B60G 2500/30* (2013.01); *B60G 2500/302* (2013.01)

(58) Field of Classification Search
CPC ............. B60G 17/056; B60G 17/0565; B60G 2500/30; B60G 2500/302; B60G 2400/0512
See application file for complete search history.

(56) References Cited

U.S. PATENT DOCUMENTS

| 4,856,798 A * | 8/1989 | Buma .................. B60G 17/016 180/41 |
| 5,452,919 A * | 9/1995 | Hoyle ................ B60G 17/0155 280/5.505 |
| 2013/0099456 A1 * | 4/2013 | Oshita ................ B60G 17/0432 280/5.508 |

FOREIGN PATENT DOCUMENTS

WO    94/00307 A2    1/1994

OTHER PUBLICATIONS

May 16, 2013 International Search Report for PCT/EP2013/050827.

*Primary Examiner* — Faye M Fleming
(74) *Attorney, Agent, or Firm* — Howard & Howard Attorneys PLLC

(57) ABSTRACT

The system includes: a first pair of hydraulic linear actuators between a vehicle body and a respective rear wheel such that extension and compression the actuators causes increase and a decrease, respectively, in the height of the body from the ground at the rear axle; a second pair of actuators between the body and a respective front wheel such that extension and compression of the actuators causes increase and a decrease, respectively, in the height of the vehicle body from the ground at the front axle; a supply unit for generating a flow of fluid under pressure; a tank; a hydraulic circuit connecting the pairs of actuators, supply unit, and tank; and a flow controller arranged to control the fluid between the pairs of actuators such that, during raising or lowering of the vehicle body, the height at the front axle is always less than that at the rear axle.

6 Claims, 3 Drawing Sheets

HYDRAULIC HEIGHT ADJUSTING SYSTEM FOR A VEHICLE

CROSS-REFERENCE TO RELATED APPLICATION

This application is based upon and claims priority to International Patent Application No. PCT/EP2013/050827 filed on Jan. 17, 2013.

BACKGROUND OF INVENTION

1. Field of Invention

The present invention relates to a hydraulic height adjusting system for adjusting the height of a vehicle from the ground.

2. Description of Related Art

Hydraulic height adjusting systems for adjusting the height of the body of a vehicle from the ground known in the art generally include four hydraulic linear actuators (typically single-effect actuators), each interposed between a respective wheel and the vehicle body to change the distance between the axis of rotation of that wheel and the vehicle body, and a hydraulic circuit arranged to control the flow of a fluid (typically oil) under pressure to/from the hydraulic actuators. The maximum height of the vehicle body from the ground thus corresponds to the condition where the hydraulic actuators are fully extended, whereas the minimum height of the vehicle body from the ground corresponds to the condition where the hydraulic actuators are fully compressed or retracted. The hydraulic circuit includes a pump which provides pressurized fluid to be supplied to the hydraulic actuators, and one or more flow control valves (typically solenoid valves) for controlling the flow of the pressurized fluid to/from the hydraulic actuators. The pump and the flow control valve(s) are controlled by an electronic control unit which, taking into account data sent thereto about the speed and the height from the ground, defines and sets the desired height from the ground so as to optimize the behaviour of the vehicle suspension and/or the aerodynamic efficiency of the vehicle. Typically, at low speed, the height from the ground should be at the maximum level so as to allow the vehicle to easily clear obstacles (such as potholes or bumps) on the road surface, or to easily cross steep slopes (such as garage entry ramps) without the risk of damaging the vehicle body. At high speed, however, the height from the ground should typically be at the minimum level so as to minimize the aerodynamic drag coefficient (Cx).

With such a height adjusting system, it is possible to obtain the four main operating conditions of the vehicle: 1) a static condition of minimum height from the ground, in which all four hydraulic actuators are fully compressed; 2) a static condition of maximum height from the ground, in which all four hydraulic actuators are fully extended; 3) a dynamic condition of raising, in which the pump provides pressurized fluid which is supplied to extend the four hydraulic actuators; and 4) a dynamic condition of lowering, in which the fluid is discharged from the four hydraulic actuators which subsequently retract under the effect of the vehicle's weight.

While hydraulic height systems of the above-identified type have generally performed well for their intended purpose, there remains a need in the art for a hydraulic height system that is able to change the height of the vehicle body from the ground, even if the vehicle is running at high speed, without negatively affecting the stability of the vehicle itself.

SUMMARY OF THE INVENTION

The present invention overcomes the disadvantages in the related art in a hydraulic height adjusting system for adjusting the height from the ground of a vehicle having a body, a pair of front wheels, and a pair of rear wheels. The height adjusting system includes two pairs of hydraulic actuators, a supply unit, a tank, a hydraulic circuit, and a flow controller. The first pair of hydraulic linear actuators are each placed between the vehicle body and a respective rear wheel such that extension and compression thereof brings about an increase and a decrease, respectively, in the distance between the vehicle body and the respective rear wheel, and an increase and a decrease, respectively, in the height of the vehicle body from the ground at the rear axle of the vehicle. The second pair of hydraulic linear actuators are each placed between the vehicle body and a respective front wheel such that extension and compression thereof brings about an increase and a decrease, respectively, in the distance between the vehicle body and the respective front wheel, and an increase and a decrease, respectively, in the height of the vehicle body from the ground at the front axle of the vehicle. The supply unit generates a flow of fluid under pressure. The hydraulic circuit connects the first and the second pair of hydraulic linear actuators with the supply unit and the tank. The flow controller is arranged to control the flow of the fluid under pressure between the first and the second pair of hydraulic linear actuators such that the height of the vehicle body from the ground at the front axle is always less than that at the rear axle during raising or lowering of the vehicle body.

In this way, the hydraulic height adjusting system of the present invention controls the extension and compression of the hydraulic actuators located at the front axle and at the rear axle of the vehicle so as to always ensure, in dynamic conditions of raising or lowering of the vehicle, that the height of the vehicle body from the ground at the front axle (for example, at the front wheels) is lower than that at the rear axle (for example, at the rear wheels), thereby preventing from taking during running, particularly at high speed, a so-called take-off attitude, (for example, an attitude such as to generate a lift force on the vehicle tending to reduce the stability of the vehicle itself).

In one embodiment, the height adjusting system is configured to control sequentially the actuators located at the front and rear axles of the vehicle, whereby when the height of the vehicle body from the ground is being increased, first the hydraulic actuators located at the rear axle of the vehicle are extended (which results in the rear axle of the vehicle being raised) and then the hydraulic actuators located at the front axle of the vehicle are extended (which then results in the front axle of the vehicle being also raised), whereas when the height of the vehicle body from the ground is being decreased, first the hydraulic actuators located at the front axle of the vehicle are compressed (which results in the front axle of the vehicle being lowered) and then the hydraulic actuators located at the rear axle of the vehicle are compressed (which then results in the rear axle of the vehicle being also lowered).

In order to allow to sequentially control the hydraulic actuators located at the two axles of the vehicle, the hydraulic circuit of the height adjusting system may include a first flow-control solenoid valve arranged to control the flow of the fluid under pressure from/to the hydraulic actuators located at the rear axle of the vehicle and, in series with and downstream of this valve, a second flow-control solenoid valve arranged to control the flow of the fluid under pressure from/to the hydraulic actuators located at the front axle of the vehicle. With the arrangement of the two flow-control solenoid valves, the fluid under pressure generated by the pump of the hydraulic control circuit is supplied first to the rear hydraulic actuators and then, after a delay (which can be set by the electronic control unit by adjusting the time when the flow-control solenoid valve associated to the front actuators is activated), to the front actuators. Accordingly, when the height from the ground is being increased, the rear axle of the vehicle is always raised before the front axle and the vehicle is thus prevented from taking a take-off attitude.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
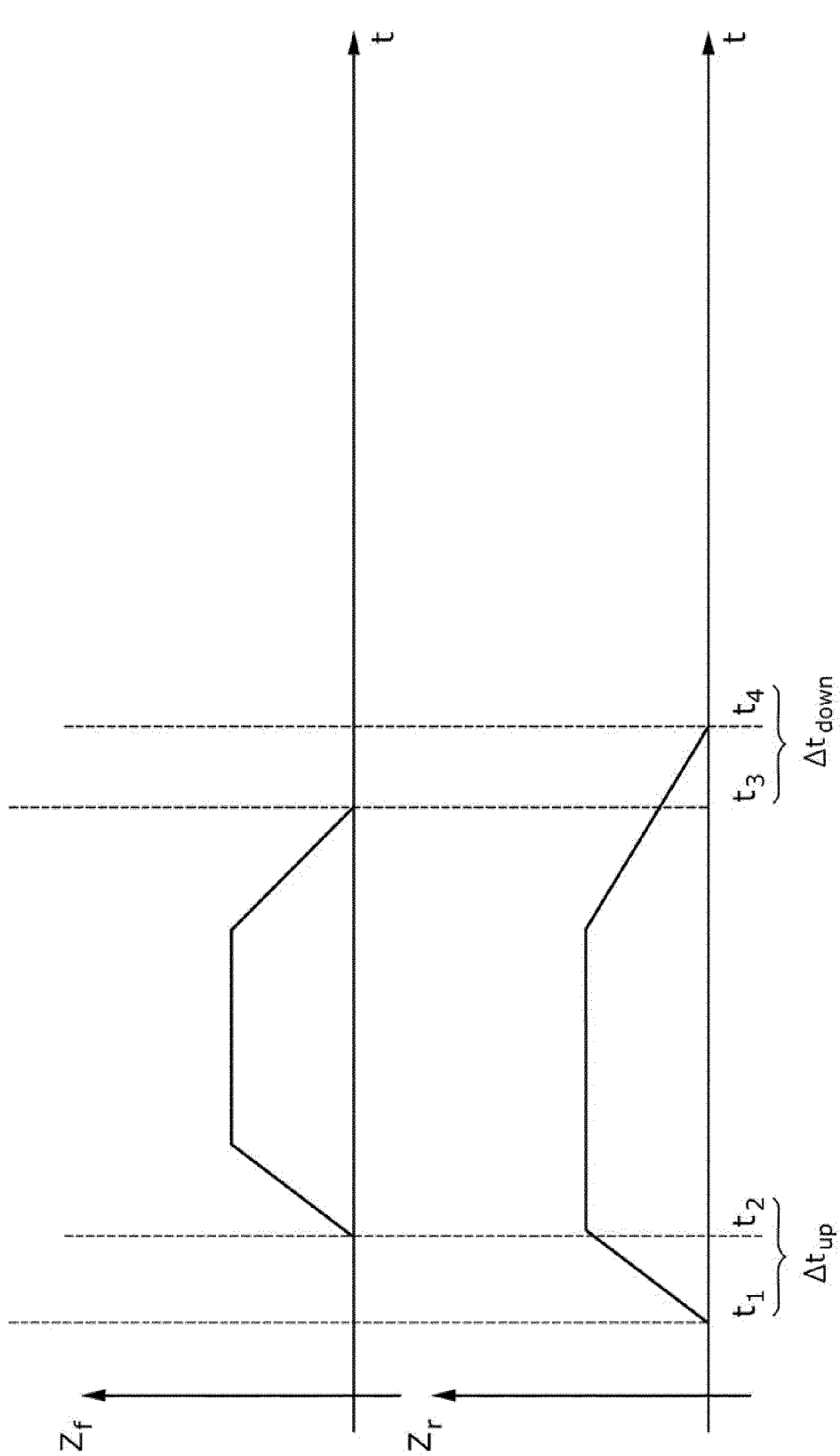
FIG. 1 is a graph showing, on the same time scale, the desired variation profiles of the height of the body of a vehicle from the ground, at the front axle and at the rear axle of the vehicle, respectively, such as to ensure that the vehicle never takes a take-off attitude.

With reference first to FIG. 1, the graph depicted therein shows, on the same time scale, the desired variation profiles of the height of the body of a vehicle from the ground, at the front axle ($z_f$) and at the rear axle ($z_r$) of the vehicle, respectively, such as to ensure that the vehicle does not take a take-off attitude. Starting from a condition of minimum height from the ground, both at the front axle and at the rear axle, the rear axle is first raised (time $t_1$) and then, at time $t_2$, the front axle is also raised. The delay $\Delta t_{up} = t_2 - t_1$ with which the front axle is raised is longer than a given limit value, which can be set beforehand or established from time to time depending of the driving conditions of the vehicle. During lowering of the vehicle, the time (indicated $t_3$) when the front axle reaches the minimum height precedes the time (indicated $t_4$) when the rear axle reaches the minimum height. Also in this case, the delay $\Delta t_{down} = t_4 - t_3$ with which the rear axle reaches the minimum height from the ground with respect to the front axle is longer than a given limit value, which can be set beforehand or established from time to time depending on the driving conditions of the vehicle.

Figure 2:
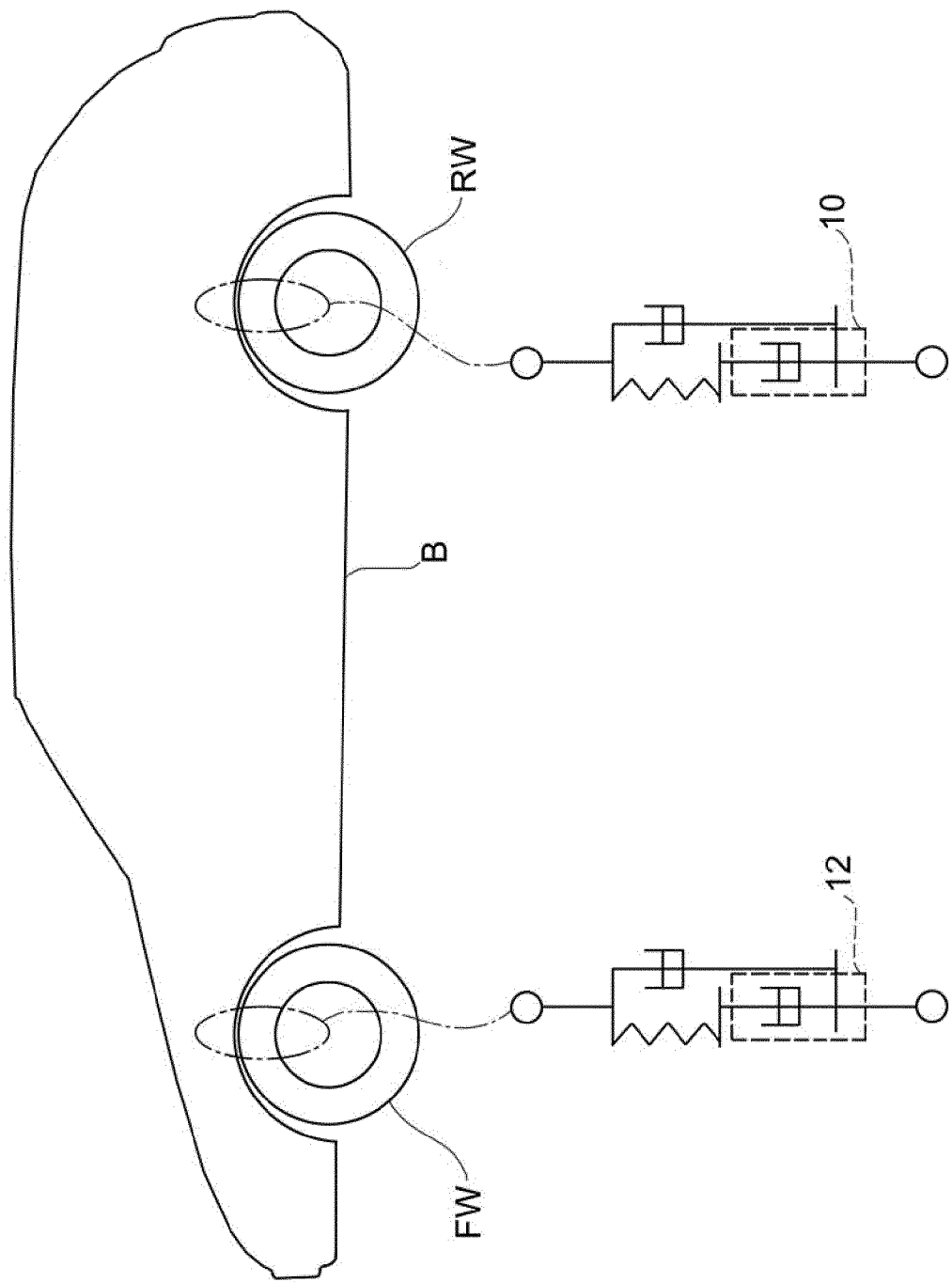
FIG. 2 schematically shows in side view a vehicle provided at its wheels with respective hydraulic actuators operable to adjust the height of the vehicle body from the ground.
Figure 3:
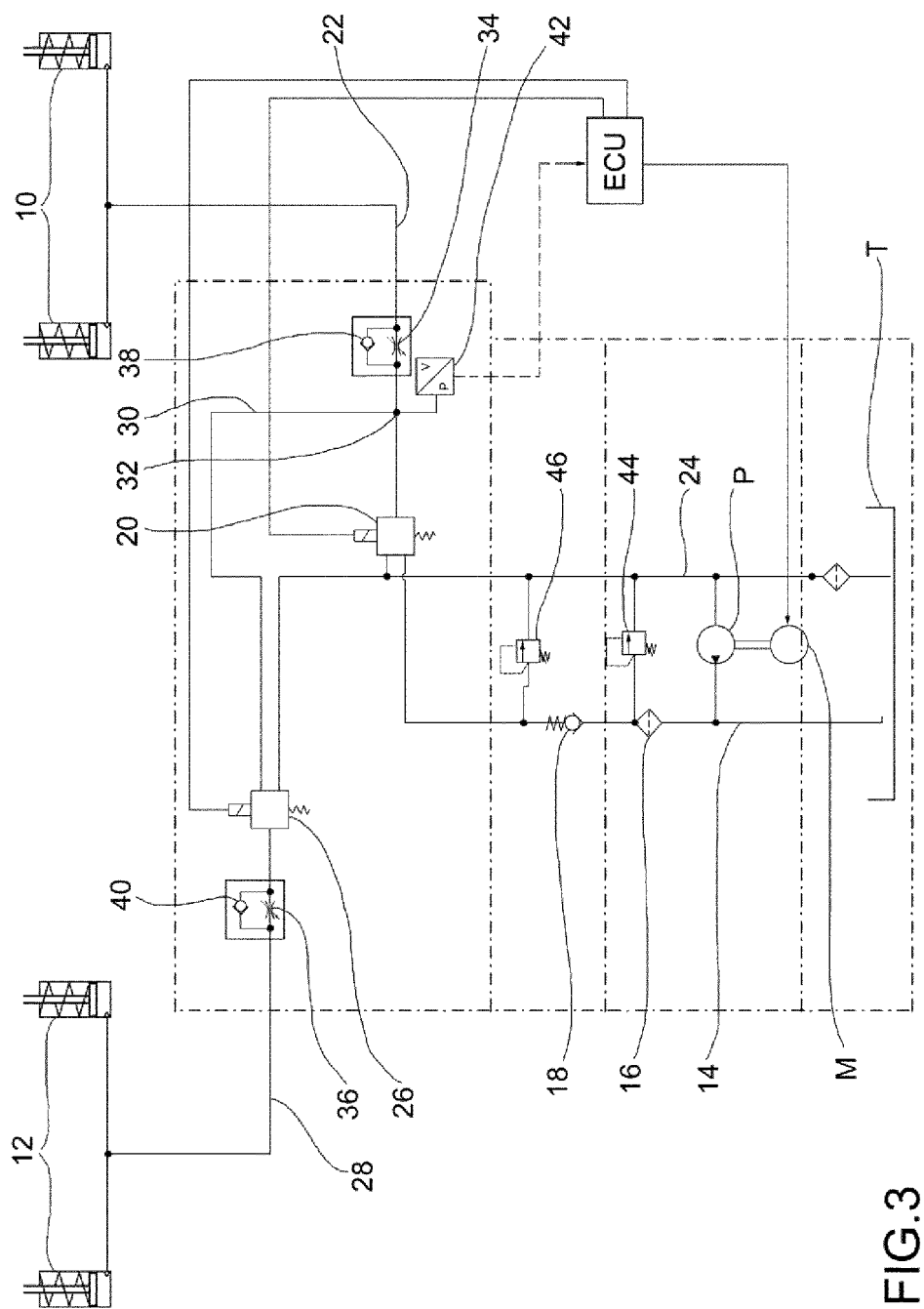
FIG. 3 schematically shows a hydraulic height adjusting system according to one embodiment of the present invention, arranged to control the hydraulic actuators of the vehicle of FIG. 2 in order to adjust the height of the vehicle body from the ground.

In order to ensure the possibility of obtaining variation profiles of the height of a vehicle from the ground such as those described above with reference to FIG. 1, the present invention provides a hydraulic height adjusting system for adjusting the height of a vehicle body from the ground, an embodiment of which is schematically shown in FIGS. 2 and 3. With reference now to FIGS. 2 and 3, the height adjusting system includes four hydraulic linear actuators (hereinafter simply referred to as actuators), namely a pair of rear actuators 10, each located between the vehicle body (indicated at B in FIG. 2) and a respective rear wheel (indicated at RW in FIG. 2), as well as a pair of front actuators 12, each located between the vehicle body B and a respective front wheel (indicated at FW in FIG. 2). The actuators 10 and 12 are configured so as to cause, when they are extended, an increase in the distance between the vehicle body B and the respective rear wheel RW, or front wheel FW, and hence in the height of the vehicle body from the ground, and, when they are compressed, a decrease in the distance between the vehicle body B and the respective rear wheel RW, or front wheel FW, and hence in the height of the vehicle body from the ground, at the rear axle and at the front axle, respectively. The actuators 10 and 12 may be single-effect actuators and, therefore, when supplied with fluid under pressure (in particular oil) they cause the height from the ground to increase, whereas when discharged they cause the height from the ground to decrease.

The height adjusting system further includes a supply unit provided with a pump P, a tank T, and a hydraulic circuit which connects the actuators 10 and 12 with the pump P and with the tank T. The pump P is driven by a motor M and generates fluid under pressure to be supplied to the actuators 10 and 12 through a supply line 14. A filter 16 and a check valve 18, both of the type known in the art, are located in the supply line 14. A first flow-control solenoid valve 20 (hereinafter referred to as first solenoid valve), which controls the flow of the fluid through the supply line 14, through a first feed line 22 connected to the rear actuators 10 and through a discharge line 24 connected to the tank T, is located in the supply line 14, downstream of the check valve 18. The first solenoid valve 20 has at least one first position (working position), in which it puts the first feed line 22 into communication with the supply line 14, and a second position (rest position), in which it puts the first feed line 22 into communication with the discharge line 24. Therefore, when the first solenoid valve 20 is activated, it puts the first feed line 22 into communication with the supply line 14 and the fluid under pressure generated by the pump P is supplied to the rear actuators 10, which results in these latter being extended and in the rear axle of the vehicle being raised.

The hydraulic circuit also includes with a second flow-control solenoid valve 26 (hereinafter referred to as second solenoid valve), which controls the flow from/to a second feed line 28 connected to the front actuators 12. The second solenoid valve 26 has at least one first position (working position) in which it puts the second feed line 28 into communication with a branch line 30, which originates from a branching point 32 placed on the first feed line 22, and a second position (rest position) in which it puts the second feed line 28 into communication with the discharge line 24. Therefore, when the second solenoid valve 26 is activated, it puts the second feed line 28 into communication with the supply line 14 through the first feed line 22 and the branch line 30, and the fluid under pressure generated by the pump P is supplied to the front actuators 12 as well, which causes extension of these latter and raising of the front axle of the vehicle. More specifically, the second solenoid valve 26 associated to the front actuators 12 is then arranged in series with (and downstream of) the first solenoid valve 20 associated to the rear actuators 10. Variable restrictors 34 and 36 are located in the first feed line 22 and in the second feed line 28, respectively, and are arranged in parallel each with a respective check valve 38 and 40, whereby the restrictor 34 acts only when the fluid is being discharged from the rear actuators 10 while the restrictor 36 acts only when the front actuators 12 are being supplied with fluid.

A pressure sensor 42 is also provided and is arranged to detect the pressure of the fluid at the branching point 32 and to send a corresponding signal to an electronic control unit ECU which manages the operation of the height adjusting system by controlling the motor M and the solenoid valves 20 and 26. Finally, the supply line 14 and the discharge line 24 are in communication with each other through a first maximum pressure valve 44 which intercepts the fluid in the supply line 14 between the filter 16 and the check valve 18, and through a second maximum pressure valve 46 which intercepts the fluid in the supply line 14 downstream of the check valve 18.

In operation, in order to raise the vehicle body sequentially, first at the rear axle and then at the front axle, the electronic control unit ECU first activates the first solenoid valve 20, so as to supply the rear actuators 10 with fluid under pressure, and then, after a certain time interval, also the second solenoid valve 26, so as to supply also the front actuators 12 with fluid under pressure. In order for the front actuators 12 to be also supplied with fluid under pressure, the first solenoid valve 20 has to be kept in the working position. With the pressure sensor 42, the electronic control unit ECU is able to check if the rear actuators 10 have been fully extended and then for instance to activate the second solenoid valve 26 only once the rear axle of the vehicle has reached the maximum height from the ground. Further, in order to lower the vehicle body sequentially, first at the front axle and then at the rear axle, the electronic control unit ECU first brings the second solenoid valve 26 back to the rest position, so as to discharge the front actuators 12, and then, after a certain time interval, also the first solenoid valve 20, so as to discharge also the rear actuators 10. During this phase, by virtue of the fluid being discharged from the front actuators 12 through the check valve 40 and from the rear actuators 10 through the variable restrictor 34, the speed at which the front axle is lowered is higher than that at which the rear axle of the vehicle is lowered.

By virtue of the arrangement of the two solenoid valves in series with each other, with the solenoid valve controlling the flow from/to the front actuators arranged downstream of the solenoid valve controlling the flow from/to the rear actuators, the height adjusting system is able to bring about sequentially the raising of the vehicle body first at the rear axle and then at the front axle, as well as the lowering of the vehicle body first at the front axle and then at the rear axle, thereby always ensuring that the height from the ground at the front axle is not higher than that at the rear axle and that therefore the vehicle does not take a take-off attitude.

Even in case of breakdown of one of the flow-control solenoid valves, or of both of them, the vehicle body will never be raised first at the front axle and then at the rear axle, since if a breakdown of the solenoid valve associated to the rear actuators occurred, then not only the rear actuators but also the front ones could not be supplied with fluid under pressure and therefore the vehicle body would not be raised either at the front axle or at the rear axle, whereas if a breakdown of the solenoid valve associated to the front actuators occurred, then the vehicle body would be raised only at the rear axle. Even in case the supply or the discharge of the fluid occurred simultaneously for both the front actuators or for both the rear actuators, the special arrangement of the variable restrictors and of the respective check valves would anyway ensure that, when the vehicle body is being raised, it is raised more quickly at the rear axle than at the front axle, since the restrictor associated to the rear actuators would be bypassed by the respective check valve, and that, when the vehicle body is being lowered, it is lowered more quickly at the front axle than at the rear axle (the restrictor associated to the front actuators would be in fact bypassed by the respective check valve).

Moreover, by virtue of the special arrangement of the pressure sensor, the height adjusting system allows to check, with a single sensor, whether the vehicle body has been raised in sequence at the rear axle and at the front axle. Further, with the use of only one additional maximum pressure valve (for example, the one which intercepts the fluid along the supply line downstream of the check valve) it is possible to avoid overpressures in the hydraulic circuit in case of the fluid becoming too hot.

It will be appreciated that, with the principle of the invention remaining unchanged, the embodiments and the constructional details may vary widely from those described and illustrated purely by way of non-limiting example. For instance, in one embodiment, the hydraulic circuit could include only one flow-control solenoid valve placed upstream of the branching point. In this case, therefore, it would be no longer possible to supply and discharge sequentially the actuators placed on the two axles of the vehicle, but by virtue of the arrangement of the variable restrictors and of the respective check valves it would be, however, ensured that when the vehicle body is being raised, it is raised more quickly at the rear axle than at the front axle, and that when the vehicle body is being lowered, it is lowered more quickly at the front axle than at the rear axle. Regardless, the object of ensuring the stability of the vehicle, by preventing it from taking, in raising and lowering dynamic conditions, a take-off attitude, would be reached even with such a variant of the height adjusting system according to the invention.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A hydraulic height adjusting system for adjusting the height from the ground of a vehicle having a body, a pair of front wheels, and a pair of rear wheels, the height adjusting system comprising:
a first pair of hydraulic linear actuators placed each between the vehicle body and a respective rear wheel such that the extension and compression of each of the hydraulic linear actuators of said first pair of hydraulic linear actuators bring about an increase and a decrease, respectively, in the distance between the vehicle body and the respective rear wheel, and an increase and a decrease, respectively, in the height of the vehicle body from the ground at the rear axle of the vehicle,
a second pair of hydraulic linear actuators placed each between the vehicle body and a respective front wheel such that the extension and compression of each of the hydraulic linear actuators of said second pair of hydraulic linear actuators bring about an increase and a decrease, respectively, in the distance between the vehicle body and the respective front wheel, and an increase and a decrease, respectively, in the height of the vehicle body from the ground at the front axle of the vehicle,
a supply unit for generating a flow of fluid under pressure,
a tank,
a hydraulic circuit connecting the first and the second pair of hydraulic linear actuators with the supply unit and with the tank, and
a flow controller arranged to control the flow of the fluid under pressure to and from the first and the second pair of hydraulic linear actuators,
wherein said flow controller includes a first solenoid valve arranged to control the flow of the fluid under pressure to and from the first pair of hydraulic linear actuators, a second solenoid valve arranged in series with and downstream of the first solenoid valve to control the flow of the fluid under pressure to and from the second pair of hydraulic linear actuators, and an electronic control unit arranged to control the first and the second solenoid valve so that when the height from the ground is to be increased the fluid under pressure is supplied first to the first pair of hydraulic linear actuators and then to the second pair of hydraulic linear actuators and that when the height from the ground is to be decreased the fluid under pressure is discharged first from the second pair of hydraulic linear actuators and then from the first pair of hydraulic linear actuators, wherein said flow controller is configured to ensure that height of the vehicle body from the ground at the front axle is always less than that at the rear axle during raising or lowering of the vehicle body, and wherein the hydraulic circuit includes a supply line connected to the supply unit, a discharge line connected to the tank, a first feed line connected to the first pair of hydraulic linear actuators, a second feed line connected to the second pair of hydraulic linear actuators, and a branch line branching from the first feed line at a branching point, wherein the first solenoid valve is interposed between the supply line and the first feed line upstream of the branching point and wherein the second solenoid valve is interposed between the branch line and the second feed line.

2. The height adjusting system as set forth in claim 1, wherein the first and the second solenoid valve are both three-way two-position solenoid valves, the first solenoid valve being arranged to connect the first feed line with one of the supply line and the discharge line, and the second solenoid valve being arranged to connect the second feed line with one of the branch line and the discharge line.

3. The height adjusting system as set forth in claim 1, wherein said flow controller further includes a first variable restrictor located in the first feed line, a second variable restrictor located in the second feed line, a first check valve arranged in parallel with the first variable restrictor, and a second check valve arranged in parallel with the second variable restrictor, whereby the first variable restrictor acts only when the fluid is discharged from the first pair of hydraulic linear actuators and the second variable restrictor acts only when the fluid is supplied to the second pair of hydraulic linear actuators.

4. The height adjusting system as set forth in claim 1, further including a pressure sensor arranged to detect the pressure of the fluid at the branching point and to send a corresponding signal to the electronic control unit.

5. A hydraulic height adjusting system for adjusting the height from the ground of a vehicle having a body, a pair of front wheels, and a pair of rear wheels, the height adjusting system including:

a first pair of hydraulic linear actuators placed each between the vehicle body and a respective rear wheel such that the extension and compression of each of the hydraulic linear actuators of said first pair of hydraulic linear actuators bring about an increase and a decrease, respectively, in the distance between the vehicle body and the respective rear wheel, and an increase and a decrease, respectively, in the height of the vehicle body from the ground at the rear axle of the vehicle, a second pair of hydraulic linear actuators placed each between the vehicle body and a respective front wheel such that the extension and compression of each of the hydraulic linear actuators of said second pair of hydraulic linear actuators bring about an increase and a decrease, respectively, in the distance between the vehicle body and the respective front wheel, and an increase and a decrease, respectively, in the height of the vehicle body from the ground at the front axle of the vehicle, a supply unit for generating a flow of fluid under pressure, a tank, a hydraulic circuit connecting the first and the second pair of hydraulic linear actuators with the supply unit and with the tank, and a flow controller arranged to control the flow of the fluid under pressure to and from the first and the second pair of hydraulic linear actuators, wherein said flow controller is configured to ensure that height of the vehicle body from the ground at the front axle is always less than that at the rear axle during raising or lowering of the vehicle body, and wherein the hydraulic circuit includes a supply line which is connected to the supply unit and branches into a first feed line connected to the first pair of hydraulic linear actuators and into a second feed line connected to the second pair of hydraulic linear actuators, and wherein said flow controller includes a single solenoid valve located in the supply line to control the flow of the fluid under pressure to and from the first and the second pair of hydraulic linear actuators, an electronic control unit arranged to control the solenoid valve, a first variable restrictor located in the first feed line, a second variable restrictor located in the second feed line, a first check valve arranged in parallel with the first variable restrictor, and a second check valve arranged in parallel with the second variable restrictor.

6. A vehicle provided with a hydraulic height adjusting system for adjusting the height from the ground of a vehicle having a body, a pair of front wheels, and a pair of rear wheels, the height adjusting system including:

a first pair of hydraulic linear actuators placed each between the vehicle body and a respective rear wheel such that the extension and compression of each of the hydraulic linear actuators of said first pair of hydraulic linear actuators bring about an increase and a decrease, respectively, in the distance between the vehicle body and the respective rear wheel, and an increase and a decrease, respectively, in the height of the vehicle body from the ground at the rear axle of the vehicle, a second pair of hydraulic linear actuators placed each between the vehicle body and a respective front wheel such that the extension and compression of each of the hydraulic linear actuators of said second pair of hydraulic linear actuators bring about an increase and a decrease, respectively, in the distance between the vehicle body and the respective front wheel, and an increase and a decrease, respectively, in the height of the vehicle body from the ground at the front axle of the vehicle, a supply unit for generating a flow of fluid under pressure, a tank, a hydraulic circuit connecting the first and the second pair of hydraulic linear actuators with the supply unit and with the tank, and a flow controller arranged to control the flow of the fluid under pressure to and from the first and the second pair of hydraulic linear actuators, wherein said flow controller is configured to ensure that height of the vehicle body from the ground at the front axle is always less than that at the rear axle during raising or lowering of the vehicle body, and wherein the hydraulic circuit includes a supply line which is connected to the supply unit and branches into a first feed line connected to the first pair of hydraulic linear actuators and into a second feed line connected to the second pair of hydraulic linear actuators, and wherein said flow controller includes a single solenoid valve located in the supply line to control the flow of the fluid under pressure to and from the first and the second pair of hydraulic linear actuators, an electronic control unit arranged to control the solenoid valve, a first variable restrictor located in the first feed line, a second variable restrictor located in the second feed line, a first check valve arranged in parallel with the first variable restrictor, and a second check valve arranged in parallel with the second variable restrictor.

* * * * *